Feb. 3, 1959     A. P. PAPANEK     2,872,586

ELAPSED TIME INDICATOR

Filed Aug. 15, 1955

*INVENTOR.*
ANDREW P. PAPANEK
*BY*

ATTORNEY

United States Patent Office 2,872,586
Patented Feb. 3, 1959

2,872,586
ELAPSED TIME INDICATOR

Andrew P. Papanek, Shaker Heights, Ohio, assignor to Jack & Heintz, Inc., Cleveland, Ohio, a corporation of Delaware Application August 15, 1955, Serial No. 528,223

9 Claims. (Cl. 250—106)

The present invention relates to an elapsed time indicator, particularly an indicator for measuring the operating time of static and rotating equipment such as engines, accessories and machine tools.

The principal object of the present invention is the provision of a new and improved, compact and simple elapsed time indicator which does not require a warm-up period and which will reliably operate in the presence of the environmental extremes such as are encountered by equipment in military aircraft.

Another object of the present invention is to provide a new and improved elapsed time indicator in which an absorber whose physical characteristics vary with amount of radiation absorbed, is shieldable from a radiation emitting material by a shield movable between two positions respectively permitting and blocking radiation from the absorber and in which the shield is moved to one of its positions by mechanical or electromagnetic means.

Further objects and advantages will be apparent from the following detailed description of the preferred embodiment of the present invention made with reference to the accompanying drawings forming a part of this specification, and in which—

Figure 1:
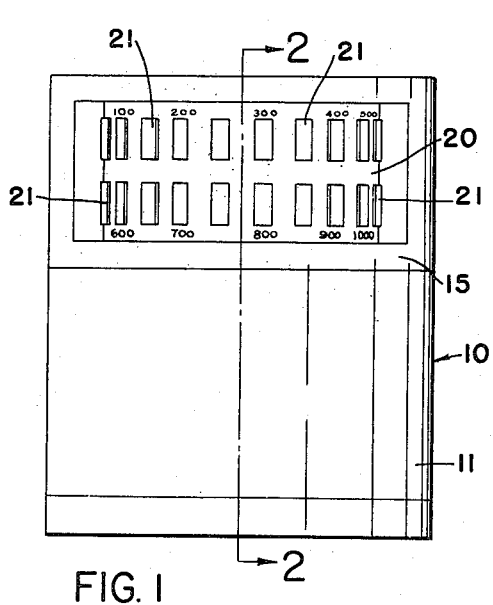
Fig. 1 is a front elevational view of an elapsed time indicator embodying the present invention.
Figure 2:
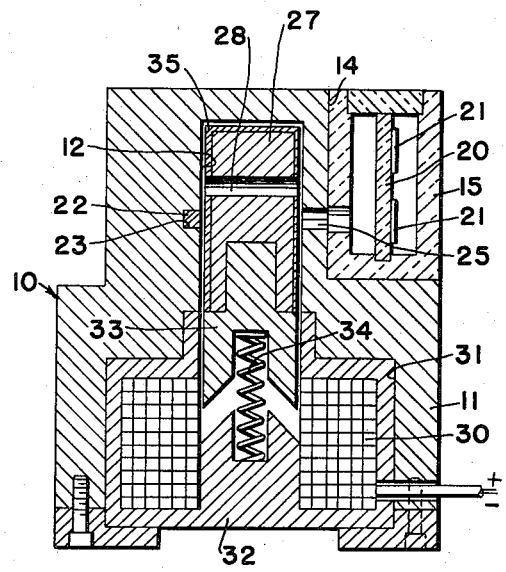
Fig. 2 is a sectional view taken approximately along line 2—2 of Fig. 1.
Figure 3:
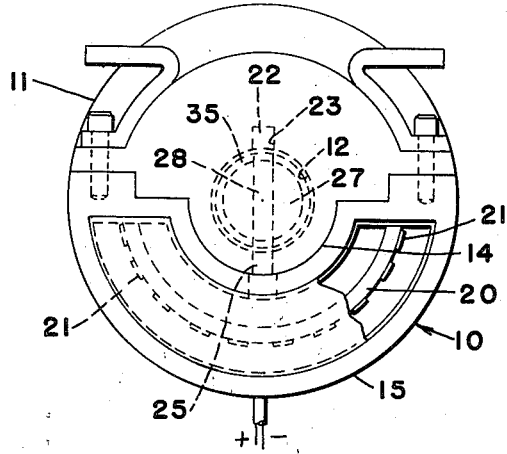
Fig. 3 is a plan view of the indicator of Fig. 1.

According to the provisions of the present invention the elapsed operating time, or non-operating time, of an apparatus is measured by permitting radiation to be transmitted during the period to be measured, between a radiator, preferably a beta ray emitter, and a radiation receiving device which includes a material having a characteristic which varies in accordance with the radiation received. By determining the change in the above-mentioned characteristic, a measure of the operating, or non-operating, time of the apparatus is obtained.

Referring to the drawings, an elapsed time indicator 10 embodying the present invention comprises a generally cylindrical body member 11, shown in the drawing with its axis vertical, having an axial bore 12 opening into the bottom thereof. The upper portion of the member 11 is cut away to form a recess 14 for receiving and supporting a closed, curved tank 15 formed of a suitable transparent radioactive transmitting material. This tank 15 is preferably removably secured to the body member 11. The tank 15 extends approximately 180°, in the illustrated embodiment about the bore 12 and has positioned therein a member 20 which extends between the top and the bottom of the tank and which supports one or more indicators 21 for indicating the length of time the tank 15 is exposed to radiation from a radiator 22. The radiator 22 is mounted in a recess 23 in the side wall of the bore 12 opening into the bore and on the side of the bore remote from the tank 15. In the preferred embodiment, the radiator 22 is preferably a radioactive material that has a long half life and capable of emitting rays, such as beta rays. I have found strontium 90 to be acceptable for my purposes. The body member 11 has a passage 25 extending between the tank 15 and the bore 12 immediately opposite to the radiator 22 to permit radiation to pass from the bore 12 to the tank, the body member 11 being opaque to the radiation.

A plunger-like shield 27 is movably supported in the bore 12 and functions to permit or to block the passage of radiation from the radiator 22 to the tank 15. The shield 27 is coated with a material 35, such as aluminum, so as to make it suitably opaque. The shield 27 is provided with a bore 28 which lies along a diameter of the shield and which is aligned with the radiator 22 and the passage 25 when the shield is in a lower position in the bore 12 and moves out of alignment with the radiator and the passage 25 when the shield is moved to an upper position in the bore 12.

The shield 27 is moved to its lower position upon the energization of an electromagnet 30 positioned in a counterbored portion 31 of the bore 12 adjacent to the lower end of the bore. The electromagnet 31 includes core member 32 and a movable armature 33, the latter being connected to the shield 27. The armature 33 and shield 27 are spring biased to their upper position in the bore 12 by a spring 34 interposed between the armature and the core member 32. When the electromagnet is energized the shield 27 and the armature 28 move downwardly, as they are viewed in the drawings, against the action of spring 34 to align the bore 28 with the radiator 22 and the passage 25. When the elapsed operating time of an instrument or other apparatus is to be measured, the electromagnet is energized when the instrument starts operating and de-energized when it stops, the energization and de-energization may be automatically accomplished. The total amount of radiation received by the tank 15 will be an indication of the total operating time of the instrument, even though the operation be intermittent.

In the preferred embodiment the tank 15 contains a radiation absorber whose physical characteristics will vary upon exposure to radiation in accordance with the total amount of radiation received by the absorber. The absorber may be an organic halide which has a degradation product upon exposure to radiation of the corresponding hydrogen halide. When an organic halide is used as an absorber the indicator 21 may comprise an acid base color indicator since the pH of the absorber depends on the amount of hydrogen halide present with each indicator changing color at a different pH value so that the time of operation may be determined by noting which indicators have changed color. Preferably, indicia are provided adjacent to each indicator reading directly in the number of operating hours necessary for the particular indicator to change color.

While the preferred embodiment has been described as utilizing an organic halide as an absorber and an acid-base color indicator it will be understood that other suitable means may be utilized to determine the total amount of radiation which passes through the passage 25, for example, a radiation measuring means utilizing a ferrous-ferric sulfate system as an absorber wherein the ferrous ion is changed to a ferric ion upon exposure to radiation with an accompanying change in optical density of the solution. Radiation sensitive photographic plates and photo sensitive materials may also be used as the radiation measuring means.

Figure 4:
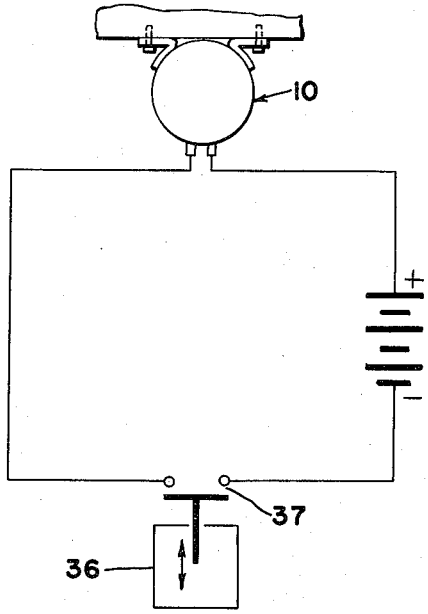
Fig. 4 is a diagrammatic view showing the indicator connected in circuit with an apparatus whose operating period is to be measured.

Fig. 4 schematically shows one manner in which the elapsed time indicator 10 may be connected in circuit with the equipment 36 of which the elapsed operating time is desired to be measured and indicated. The equipment 36, when in operation, closes a switch 37 to complete an electrical circuit to the indicator 10 so that the electromagnet 31 is energized to move the shield 27 to its radiation transmitting position each time the equipment is operated.

An elapsed time indicator embodying the present invention is compact, simple and reliable, and requires no warm up time since the movement of the shield is almost instantaneous upon energization of the electromagnet. The nature of the materials used in the indicator and its manner of operation enables the indicator to operate satisfactorily over a wide range of environmental conditions, such as temperature and pressure.

The preferred embodiment of the present invention has been described in considerable detail but further modification and variations will be apparent to those skilled in the art and it is my intention to hereby cover all such modifications and variations which fall within the scope of the appended claims.

I claim:

1. An elapsed time indicator comprising a radioactive material, radiation receiving means having a characteristic which is permanently changed in accordance with the total amount of radiation that it receives from said radioactive material disposed to be subjected to radiation from said radioactive material, movable shielding means for blocking the passage of radiation from said radioactive material to said radiation receiving means and movable to a position permitting the passage of radiation, means for moving said shielding means, and means for indicating the amount of radiation received by said radiation receiving means.

2. In combination with an operative apparatus, a radiator composed of radioactive material for emitting a radiation along a path, means for receiving radiation transmitted along said path including a material having a characteristic which is permanently changed in accordance with the total radiation received, radiation blocking means actuatable to a first position for preventing radiation from said radiator from being transmitted along said path and to a second position to permit radiation to pass from said radiator to said means for receiving radiation, and means for actuating said radiation blocking means to one of its positions when said apparatus is operating and to its other position when said apparatus is not operating.

3. In combination with an operative apparatus, a radioactive radiator for emitting a radioactive radiation along a path, means for receiving radiation transmitted along said path including a material having a characteristic which is permanently changed in accordance with the total radiation received, radiation blocking means actuatable to a first position for preventing radiation from said radiator from being transmitted along said path and to a second position to permit radiation to pass from said radiator to said means for receiving radiation, and means for actuating said radiation blocking means to one of its positions when said apparatus is operating and to its other position when said apparatus is not operating.

4. In combination with an operative apparatus, a radioactive radiator for emitting a radiation along a path, means for receiving radiation transmitted along said path including a material having a characteristic which is permanently changed in accordance with the total radiation received, radiation blocking means actuatable to a first position for preventing radiation from said radiator from being transmitted along said path and to a second position to permit radiation to pass from said radiator to said means for receiving radiation, means for actuating said radiation blocking means to one of its positions when said apparatus is operating and to its other position when said apparatus is not operating, and means responsive to said characteristic for indicating the total amount of radiation received by said means for receiving radiation.

5. In combination with an operative apparatus normally subject to intermittent operation, a radioactive radiator for emitting a radioactive radiation along a path, means for receiving radiation transmitted along said path including a material having a characteristic which is permanently changed in accordance with total amount of radiation received, radiation blocking means movable to a first position for preventing the transmission of radiation along said path and to a second position for permitting the passage of radiation from said radiator to said radiation receiving means, and electrical means for moving said radiation blocking means to one of its positions upon starting the operation of said apparatus, and means for moving said actuatable means to its other position upon the stopping of the operation of said apparatus.

6. In combination with an operative apparatus having operating periods and non-operating periods, a radioactive radiator for emitting radioactive radiation along a predetermined path, radiation receiving means disposed to receive radiation transmitted along said path including a material having a readily determinable characteristic which varies in accordance with the total amount of radiation received, a movable shield opaque to said radiation having a first position for preventing the transmission of radiation along said path and a second position for permitting radiation to pass from said radiator to said radiation receiving means, and means for moving said shield to one of its positions during the operating period of said apparatus and to its other position during the non-operating period of the apparatus.

7. The combination as defined in claim 6, wherein the means for moving the shield comprises an electromagnet for moving the shield to its second position and means for energizing the electromagnet during the operating periods of said apparatus.

8. An instrument for measuring elapsed time comprising a radioactive material, radiation receiving means including a material having a characteristic which varies in accordance with the total amount of radiation received, a shielding member intermediate said radioactive material and said radiation receiving means comprised of material opaque to the radiation from said radioactive material, an opening through said member aligned with said radioactive material and said radiation receiving means, and electromagnetically operated means for moving said shield for selectively preventing and permitting the passage of radiation through said opening.

9. An instrument for measuring elapsed time of operation of equipment, comprising a radioactive material, radiation receiving means including a material having a readily determinable characteristic which changes permanently in accordance with the total amount of radiation received, a shielding member intermediate said radioactive material and said radiation receiving means composed of material opaque to the radiation from said radioactive material, an opening through said member aligned with said radioactive material and said radiation receiving means, a movable shielding member interposed between said radioactive material and the first said member, and spring means for normally maintaining said movable shielding member in shielding position, said movable member being opaque to the radiation from said radioactive material and having an opening therethrough which is alignable with the opening in the first said member, electromagnetic means for moving said movable shielding member against the action of said spring means into a position where the opening therein is aligned with the opening in the first said member when said equipment is in operation, said spring means being adapted to continuously urge the movable shielding member toward a position for shielding the radiation receiving means from exposure to the rays of said radioactive material when said equipment is not in operation.

References Cited in the file of this patent

UNITED STATES PATENTS

| | | |
|---|---|---|
| 349,539 | Tabony | Sept. 21, 1886 |
| 1,505,198 | Hough | Aug. 19, 1924 |
| 2,465,676 | De Ment | Mar. 29, 1949 |
| 2,624,011 | Stern | Dec. 30, 1952 |
| 2,680,816 | Stern | June 8, 1954 |
| 2,692,951 | Voelker | Oct. 26, 1954 |

FOREIGN PATENTS

| | | |
|---|---|---|
| 2,432 | Great Britain | Aug. 11, 1910 |
| 792,092 | France | Dec. 21, 1935 |